United States Patent [19]
Johnston

[11] Patent Number: 5,498,434
[45] Date of Patent: Mar. 12, 1996

[54] SYNERGISTIC COMPOSITIONS FOR EXTENDING ANIMAL FEED SHELF LIFE

[75] Inventor: John D. Johnston, Jeffersonville, Ind.

[73] Assignee: Geo. Pfau's Sons Company, Inc., Jeffersonville, Ind.

[21] Appl. No.: 432,764

[22] Filed: May 2, 1995

Related U.S. Application Data

[63] Continuation of Ser. No. 838,869, Feb. 21, 1992, abandoned.
[51] Int. Cl.$^6$ ....................................................... A23D 7/00
[52] U.S. Cl. ..................... 426/541; 426/542; 426/623; 426/635; 426/645
[58] Field of Search .......................... 426/72, 541, 533, 426/805, 542, 645, 623, 635; 252/397, 398, 399

[56] References Cited

U.S. PATENT DOCUMENTS 4,877,635  10/1989  Todd ........................ 426/542
5,084,289  1/1992  Shin ........................ 426/330.6

*Primary Examiner*—Carolyn Paden
*Attorney, Agent, or Firm*—Jacobson, Price, Holman & Stern

[57]  ABSTRACT

A combination of entirely natural antioxidants provides an unexpected synergistic effect in extending the shelf life of animal-fat-containing feed when admixed with such fat or feed in amounts which are economically feasible. The specific antioxidants are lecithin, tocopherol and oil of rosemary. All combinations of at least two of these in amounts of from 0.01 to 2.0 percent by weight of lecithin, from 0.0035 to 0.056 percent by weight of tocopherol and from 0.01 to 0.10 percent by weight of oil of rosemary (based on the combined weight of antioxidant and animal fat) inordinately extend the shelf life of animal feed in general and of pet food in particular, when such products contain animal fat.

25 Claims, No Drawings

SYNERGISTIC COMPOSITIONS FOR EXTENDING ANIMAL FEED SHELF LIFE

RELATED APPLICATION

This application is a continuation of application Ser. No. 07/838,869 Feb. 21, 1992, now abandoned, the entire disclosure of which is incorporated herein by reference.

FIELD OF THE INVENTION

Antioxidants increase the shelf life of animal feed containing animal fat. It is important, particularly for pet food, to provide antioxidants which are entirely natural products, which are effective and which are economically feasible.

BACKGROUND

Animal fat, which is present in much animal feed, significantly limits the shelf life of such feed. Antioxidants have been found to improve the stability and to add to the shelf life of animal-fat-containing feed. Although there is a pressing call for animal feed without synthetic antioxidants, the cost of natural antioxidants (in the amount considered to be required) has heretofore been prohibitive.

In excess of 95 percent of the animal (mammal and/or poultry) fat used in animal feed (including pet food) is what is referred to as inedible (not for human consumption) fat, which differs significantly in antioxidant requirements from such animal fats as lard, which is edible fat. Due to the nature of raw materials from which it is derived, inedible fat often contains substances, e.g. trace metals, which serve to catalyze oxidation. For this reason, antioxidant systems intended for use in inedible fats have historically contained chelators, such as citric acid, to inactivate such substances.

Lecithin was reported as a "synergist" for antioxidants, such as tocopherol, in animal feed supplements in U.S. Pat. No. 3,293,131. The presence of fat and lecithin in pet food matrix forms is referred to in U.S. Pat. No. 3,908,025. U.S. Pat. No. 4,450,097 is directed to an antioxidant (suitable for adding to foodstuffs) extracted from rosemary. A synergistic effect was found (U.S. Pat. No. 4,525,306) for an antioxidant component (used to prevent oxidation of fats) extracted from sage and rosemary, commercial soybean lecithin and ethyl alcohol.

According to Hudson and Ghavami [*Lebensm.-Wiss. U. Technol,* 17:191 (1984)] "Certain phospholipids have been shown to exert synergistic effects with the primary antioxidant tocopherols in inhibiting autooxidation of polyunsaturated fatty acids in model systems based on both lard and soybean oil."

Oil of rosemary is an antioxidant which helps to stabilize fats according to Kalsec®'s technical data sheet (Publication No. R-10, June 1988) for Herbalox® seasoning. Enzyme-modified lecithin has been designed to enhance both water dispersibility and oil-inwater emulsifying properties of feed grade fats according to Central Soya's specifications for Blendmax®. Papas (*PETFOOD INDUSTRY,* 8 to 16, May/June 1991] report on antioxidants for pet food products; in addition to tocopherols, which are effective antioxidants for, e.g., lard, lecithin is regarded as a weak antioxidant. Han (*JAOCS,* Vol. 68, No. 10, 740 to 743, October 1991) reports antioxidative effects of tocopherol on the oxidation of sardine oil and indicates that "Lecithin can act as an antioxidant in inhibiting autoxidation of polyunsaturated fatty acids. In discussing "Synergistic Antioxidative Effects of Tocopherol and Ascorbic Acid in Fish Oil/Lecithin/Water System" (*JOACS,* Vol. 68, No. 11, 881 to 883, November 1991), Yi states:

> Because lecithin acted not only as a primary antioxidant but also as a synergist to tocopherol (9), its presence for solubilizing ascorbic acid makes it difficult to interpret the synergistic property of ascorbic acid and δ-tocopherol.

In addition, natural mixed tocopherols are sold by Eastman as foodgrade antioxidants.

SUMMARY OF THE INVENTION

Animal fat is a common ingredient in animal feed in general and in pet food in particular. Its presence provides a significant stability problem for which an antioxidant is required. With pressure to have completely natural ingredients and concurrently maintain cost at a competitive level, the use of significant quantities of effective natural antioxidants is prohibitive. Applicant has found that a combination of at least two of three particular natural antioxidants (in economically-feasible proportions) synergistically combine to impart required additional shelf life to animal-fat-containing animal feed.

The invention actually has a number of distinct aspects. One aspect is to provide a synergistic antioxidant composition useful for increasing animal fat shelf life and comprising a combination of at least two of the antioxidants:

a) from 0.01 to 2.0 (preferably from 0.01 to 0.10) parts by weight of lecithin, b) from 0.0035 to 0.2 (preferably from 0.0035 to 0.056) part by weight of tocopherol, and c) from 0.01 to 0.20 (preferably from 0.01 to 0.10) part by weight of oil of rosemary.

Another aspect is a combination of an effective amount of the noted antioxidant combination with animal fat. A further aspect of the invention is a combination of animal feed containing animal fat and an effective amount of the noted antioxidant combination to extend the shelf life of the animal feed synergistically. A still further aspect of the invention is limited to such animal feed when it is pet food.

DETAILS

There are many types of antioxidant effects, and specific antioxidants are often called for to address particular problems. Antioxidant required for extending the shelf life of animal fat in general or that actually found in animal feed is not necessarily the same as or even related to that required for, e.g., extending the shelf life of fish oil.

In that regard, all references to animal fat in this disclosure are expressly limited to mammal and poultry fat; fish fat is not included. The antioxidant and shelf-life extending problems, as well as the economics, for each are different.

By running repeated controls, the shelf life for animal fat normally found in animal feed is determined. By admixing the same animal fat with different proportions of lecithin (l), tocopherol (t) and oil of rosemary (or), the shelf life extension of time (in hours) is measured. Typical results (based on Rancimat oxidative stabilities run at 110° C., with temperature correction of 4.4° C., air at 20 1/hr. and ΔK=30 µS/cm., and all hours calculated as an average of evaluation method 1 and evaluation method 2, where 1 is induction time and 2 is time at ΔK) are shown in Table I.

Such results are obtained with, e.g., Centrol 3F-UB lecithin, Eastman GT-2 or Henkel Coviox T-70 tocopherol (both 70% mixed tocopherols), Kalsec® Herbalox® Type O oil of rosemary and refined and bleached poultry (inedible) fat. Other inedible animal fats yield similar results.

TABLE I

Oxidative Stability for Refined Inedible Animal fat

| Lecithin (l) | | Tocopherol (t) | | Oil of Rosemary (or) | |
|---|---|---|---|---|---|
| Addition (%) | Increase (hr.) | Addition (%) | Increase (hr.) | Addition (%) | Increase (hr.) |
| 0.0125 | 0.89 | | | | |
| 0.0250 | 1.33 | 0.0035 | 0.65 | 0.01 | 0.21 |
| 0.050 | 1.77 | | | | |
| 0.100 | 2.15 | 0.00070 | 1.50 | 0.02 | 0.55 |
| 0.200 | 2.90 | | | | |
| 0.400 | 3.69 | 0.0140 | 2.61 | 0.05 | 2.06 |
| 0.500 | 3.98 | | | | |
| 1.00 | 5.43 | 0.0280 | 3.95 | 0.10 | 5.54 |
| 2.00 | 10.04 | 0.0560 | 5.25 | | |

The range of percentages of added antioxidants is based on a combination of economics and synergy. By combining at least two of the selected natural antioxidants in the indicated proportions (based on the total weight of antioxidant and inedible fat to be protected) a totally unexpected increase in shelf life is achieved, as reflected by the data reported in Table II. In the table the estimated extended time is based on data, such as that reflected in Table I. The net synergy is the

TABLE II

Extended Shelf Life Time and Synergy

| (l) (%) | (t) (%) | (or) (%) | Ext. Time (hr.) | Est. Ext. Time (hr.) | Net Synergy | Synergy (%) |
|---|---|---|---|---|---|---|
| 0.01 | 0.014 | — | 5.43 | 3.41 | 2.02 | 59 |
| 0.10 | 0.014 | — | 8.10 | 4.76 | 3.34 | 70 |
| 0.20 | 0.007 | — | 7.31 | 4.40 | 2.91 | 66 |
| 0.20 | 0.014 | — | 10.39 | 5.51 | 4.88 | 89 |
| 0.50 | 0.007 | — | 9.38 | 5.48 | 3.90 | 71 |
| 1.00 | 0.007 | — | 12.93 | 6.93 | 6.00 | 87 |
| 0.20 | — | 0.010 | 2.84 | 3.11 | −0.27 | −9 |
| 0.20 | — | 0.020 | 6.65 | 3.45 | 3.2 | 93 |
| 0.25 | — | 0.030 | 5.98 | 4.15 | 1.83 | 44 |
| — | 0.007 | 0.010 | 3.29 | 1.71 | 1.58 | 92 |
| 0.20 | 0.007 | 0.010 | 8.93 | 4.61 | 4.37 | 94 |
| 0.20 | 0.0035 | 0.030 | 8.90 | 4.60 | 4.30 | 93 |
| 0.20 | 0.007 | 0.020 | 11.60 | 4.95 | 6.65 | 134 |
| 0.20 | — | 0.030 | 6.85 | 3.95 | 2.90 | 73 |
| — | 0.007 | 0.010 | 3.29 | 1.71 | 1.58 | 92 | excess in hours of extended shelf life over that estimated. Synergies of 40% or more are particularly advantageous and most unexpected.

The subject antioxidant compositions are preferably, but not necessarily, preliminarily admixed with animal fat prior to incorporating the animal fat in animal feed (including pet food), which is otherwise prepared in established and conventional fashion. Since antioxidant cost is a critical factor, the particular combination of antioxidants and amounts of each employed at any particular time is based of both the extended shelf life obtained and the market. The antioxidant effect is achieved without ascorbic acid, citric acid or esters thereof, and compositions free of these ingredients are preferred.

The invention and its advantages are readily understood from the foregoing description. Various changes may be made in the compositions without departing from the spirit and scope of the invention or sacrificing its material advantages. The compositions hereinbefore described are merely illustrative of preferred embodiments of the invention.

What is claimed is:

1. An antioxidant composition which is composed of completely natural ingredients and which is synergistically effective and economically feasible for increasing shelf life of animal feed, containing animal (mammal or poultry) fat normally found in animal feed, when in admixture with 100 parts by weight of the animal fat,
   the composition comprising a combination of at least two non-synthetic members selected from the group consisting of:
   a) from 0.01 to 2.0 parts by weight of lecithin,
   b) from 0.0035 to 0.2 part by weight tocopherol, and
   c) from 0.01 to 0.20 part by weight oil of rosemary.

2. A composition of claim 1 consisting essentially of from 0.01 to 1.0 part by weight of lecithin and from 0.0035 to 0.056 part by weight of tocopherol.

3. A composition of claim 1 consisting essentially of 0.01 to 1.0 part by weight of lecithin and from 0.01 to 0.10 part by weight of oil of rosemary.

4. A composition of claim 1 consisting essentially of from 0.0035 to 0,056 part by weight of tocopherol and from 0.01 to 0.10 part by weight of oil or rosemary.

5. A composition of claim 1 consisting essentially of lecithin, tocopherol and oil of rosemary.

6. A composition comprising mammal or poultry fat normally found in animal feed and an antioxidant-effective amount of a composition of claim 1.

7. A composition of claim 6 having storage stability for a period of time at least forty percent greater than the period of time attributable to the sum of components (a), (b) and (c) individually, in the amounts respectively present in the composition.

8. A composition of claim 6 comprising from 0.01 to 1.0 percent by weight of lecithin, based on the combined weight of lecithin and mammal or poultry fat.

9. A composition of claim 6 comprising from 0.0035 to 0.056 percent by weight of tocopherol, based on the combined weight of tocopherol and mammal or poultry fat.

10. A composition of claim 6 comprising from 0.01 to 0.10 percent by weight of oil of rosemary, based on the combined weight of oil of rosemary and mammal or poultry fat.

11. An animal feed composition comprising mammal or poultry fat and an effective amount of a composition of claim 1 to increase storage stability of the composition.

12. A composition of claim 11 having storage stability for a period of time at least forty percent greater than the period of time attributable to the sum of components (a), (b) and (c), individually, in the amounts respectively present in the composition.

13. A pet food composition comprising mammal or poultry fat and an effective amount of a composition of claim 1 to increase storage stability of the composition.

14. A composition of claim 13 having storage stability for a period of time at least forty percent greater than the period of time attributable to the sum of components (a), (b) and (c), individually, in the amounts respectively present in the composition.

15. A composition of claim 13 comprising from 0.01 to 1.0 percent by weight of lecithin, based on the combined weight of lecithin and mammal or poultry fat.

16. A composition of claim 13 comprising from 0.0035 to 0.056 percent by weight of tocopherol, based on the combined weight of tocopherol and mammal or poultry fat.

17. A composition of claim 13 comprising from 0.01 to 0.10 percent by weight of oil of rosemary, based on the combined weight of oil of rosemary and mammal or poultry fat.

18. A composition of claim 13 comprising from 0.01 to 1.0 percent by weight of lecithin, from 0.0035 to 0,056 percent by weight of tocopherol and from 0.01 to 0.10 percent by weight of oil of rosemary, based on the combined weight of antioxidant and mammal or poultry fat.

19. A method of increasing the storage stability of mammal or poultry fat normally found in animal feed which comprises admixing therewith an effective amount of a composition of claim 1 to increase the storage stability thereof for a period of time at least 40 percent greater than the period of time attributable to the sum of components (a), (b) and (c), individually, in the amounts respectfully present in the composition.

20. A method of economically increasing the storage stability of an animal feed composition comprising mammal or poultry fat, which method comprises incorporating therein an effective amount of a composition of claim 1.

21. A method of economically increasing the storage stability of a pet food composition comprising mammal or poultry fat, which method comprises admixing with such pet food an effective amount of a composition of claim 1.

22. A composition of claim 1 comprising lecithin, tocopherol and oil of rosemary.

23. A composition of claim 1 which, when in a 100 parts-by-weight admixture with the animal fat, increases the shelf life of the animal fat at least forty percent.

24. A composition of claim 1 which comprises no essential antioxidant component other than lecithin, tocopherol and oil of rosemary.

25. A composition of claim 1 which is free from citric acid, ascorbic acid or an ester of either.

* * * * *